US012794383B2

(12) United States Patent
Thiessen et al.

(10) Patent No.: US 12,794,383 B2
(45) Date of Patent: Nov. 10, 2026

(54) SYSTEM AND METHOD TO REDUCE FRICTION BETWEEN MATERIALS IN CONTACT

(71) Applicant: Nebulr Inc., LLC, Freeport, NY (US)

(72) Inventors: Adam Thiessen, New York, NY (US); Jordan Salhoobi, Tarrytown, NY (US)

(73) Assignee: Nebulr Inc., LLC, Freeport, NY (US)

( * ) Notice: Subject to any disclaimer, the term of this patent is extended or adjusted under 35 U.S.C. 154(b) by 406 days.

(21) Appl. No.: 18/468,430

(22) Filed: Sep. 15, 2023

(65) Prior Publication Data

US 2025/0096704 A1 Mar. 20, 2025

(51) Int. Cl.
*H02N 15/00* (2006.01)

(52) U.S. Cl.
CPC .................................... *H02N 15/00* (2013.01)

(58) Field of Classification Search
CPC ........................ Y10T 428/12486; H02N 15/00
See application file for complete search history.

(56) References Cited

U.S. PATENT DOCUMENTS

| | | | | |
|---|---|---|---|---|
| 2,297,658 A | 9/1942 | Lincoln et al. | | |
| 2,617,064 A * | 11/1952 | Lewin | H01J 13/10 | 313/328 |
| 3,377,277 A | 4/1968 | Soulen | | |
| 3,682,606 A * | 8/1972 | Anderson et al. | C22C 47/20 | 228/262.44 |
| 8,733,615 B2 | 5/2014 | Nalagatla et al. | | |
| 9,901,660 B2 | 2/2018 | Klein et al. | | |
| 11,020,933 B2 | 6/2021 | Hsu et al. | | |
| 2017/0121626 A1 | 5/2017 | Nakaya et al. | | |

* cited by examiner

*Primary Examiner* — Adam Krupicka

(57) ABSTRACT

An invented component, manufacturing system and process for manufacturing the invented component is described. Two components that will interact with each other to create friction between the components will have a layer of relatively higher electronegative material located beneath the surfaces of the components. The layer of relatively higher electronegative material within each component will have suitable properties and substance to reduce the ability of the components to create temporary dipoles at the contacting surfaces of the two components thereby reducing friction between the two components.

20 Claims, 7 Drawing Sheets

SYSTEM AND METHOD TO REDUCE FRICTION BETWEEN MATERIALS IN CONTACT

BACKGROUND

Field of the Present Disclosure

The technology relates to the general field of friction reduction, and has certain specific application to the use of lubricants between components of a device in relative motion while in contact. Specifically, this invention will reduce and/or eliminate the need for the use of lubricants for components in relative motion and in contact or near contact with each other.

Description of the Related Art

Friction is a force that opposes the relative motion or tendency of motion between two surfaces in contact. It arises due to the interaction between the microscopic irregularities present on the surfaces of objects. When two surfaces come into contact and one tries to move or slide over the other, the irregularities or bumps on the surfaces interlock with each other. This interlocking creates resistance and hinders the motion, resulting in the generation of frictional forces. Friction can cause energy loss, wear and tear of surfaces, and can be a limiting factor in many mechanical systems. Therefore, it is important to consider and manage friction in various applications and designs.

As friction is caused by the physical interaction between two surfaces moving against each other, the amount of friction generated will depend on the strength of the forces that are attracting the surfaces together. For example, a heavier object will have a greater gravitational force than a lighter object with the ground. Consequently, the heavier object will create more friction when trying to move it along the floor.

In addition to gravitational forces, another attractive force between two contacting surfaces is caused by the creation of temporary dipoles. Temporary dipoles arise from the fluctuations in the electron distribution within molecules, leading to temporary imbalances of charge which may cause one side of the substance to become more negative/less positive than the other. When two surfaces are in contact and, also at times when in motion relative to each other, temporary dipoles caused by random oddities in electron distribution on one surface can induce opposing dipoles in nearby surfaces. This dipole inducing behavior causes each of the respective surfaces to have opposite electrical polarization, namely, one surface has a negative charge and the other will have a positive charge. This will create an attractive force that will increase the frictional force between the surfaces.

Most mechanical systems that seek to reduce friction will use a type of liquid lubrication, such as oil, synthetic oils or grease. Lubrication plays a role in reducing friction between two surfaces in contact by forming a thin film or layer between the surfaces that will be in contact with each other. In this manner, lubrication will create a barrier, separating the two surfaces, smoothening the surfaces, minimizing heat generation, and preventing excessive wear. It is widely employed in various industries and applications, including automotive engines, machinery, bearings, gears, and many other mechanical systems.

The use of lubricants to reduce friction have many disadvantages. Lubricants can be expensive and harsh on the environment. The lubrication often has to be replaced as the liquid can easily be displaced from the desired area. In addition, the lubrication can absorb impurities and becomes destructive to the structure it is supposed to protect or the liquid breaks down. In addition, many economic difficulties globally arise from the demand for oils.

SUMMARY OF THE INVENTION

It is an object of the invention to provide a system and method of reducing friction independent of the use of lubricants between two components whose surfaces are in contact with each other. The invented system will place a highly electronegative substance underneath the surface of each of the contacting surfaces. The placement of this electronegative substance below the surface of the component pulls the electrons of the contacting surfaces towards the electronegative substance. The location of this electronegative substance will reduce the tendency to create temporary dipoles as between the contacting surfaces, which is thought to be a component of friction between substances. Hence, both surfaces will have a reduced frictional attraction to each other due to the reduction of spontaneous induced dipoles occurring at the contact point between the two surfaces. In addition, the similarity of the electrical polarity between the two contact surfaces will create an electrically repulsive force as between the surfaces. This electric repulsive force will also reduce the friction created between the two surfaces.

These and other objects, features and advantages of the present disclosure will become more apparent upon reading of the following detailed description along with the accompanying drawings.

DETAILED DESCRIPTION OF THE INVENTION

Hereinafter, an embodiment according to an aspect of the present disclosure will be explained with reference to drawings.

Figure 1:
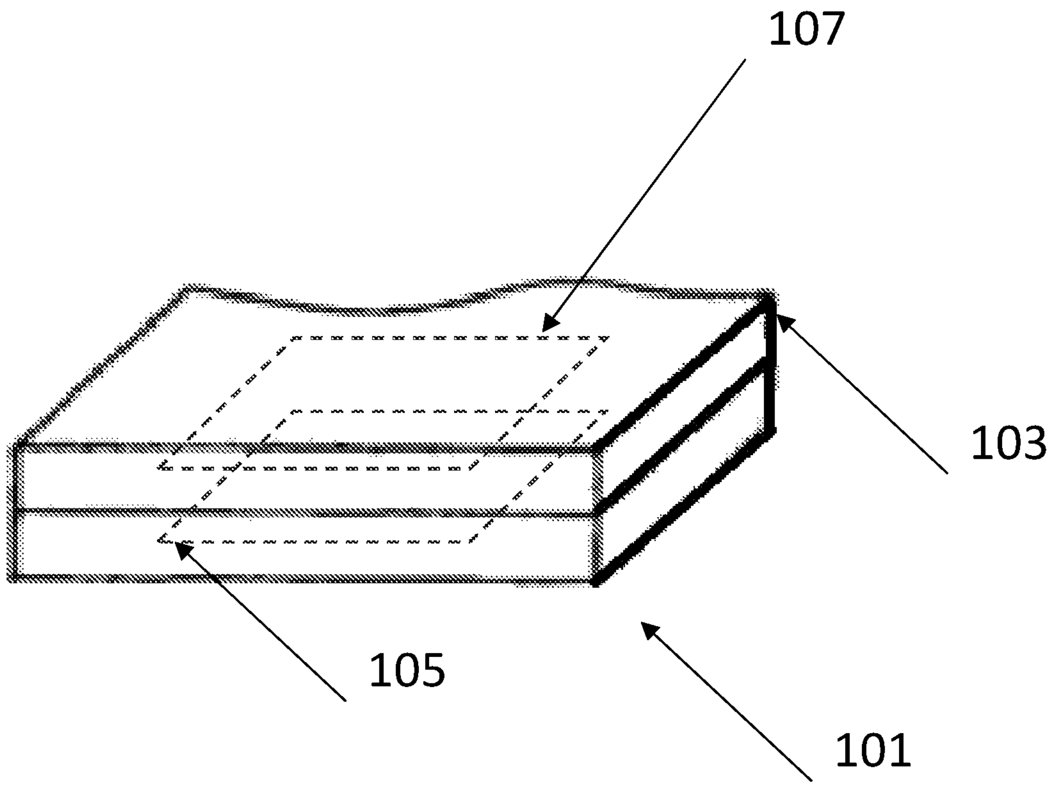
FIG. 1 shows a perspective view of one embodiment of the invented system.

FIG. 1 depicts a perspective view of the invented components, system and method. The figure depicts one component 101 in direct contact with a second component 103. Each of the materials will have a deposit of an electronegative material 105, 107 inside the component and below the surface of each material. Components 101, 103 can be part of any mechanical system or machine that will physically interact with each other and create friction as between the components. Similarly, while depicted as being rectangular, the form of the components is not essential to the invention and any other shapes are possible and within the scope of the invention.

Figure 2:
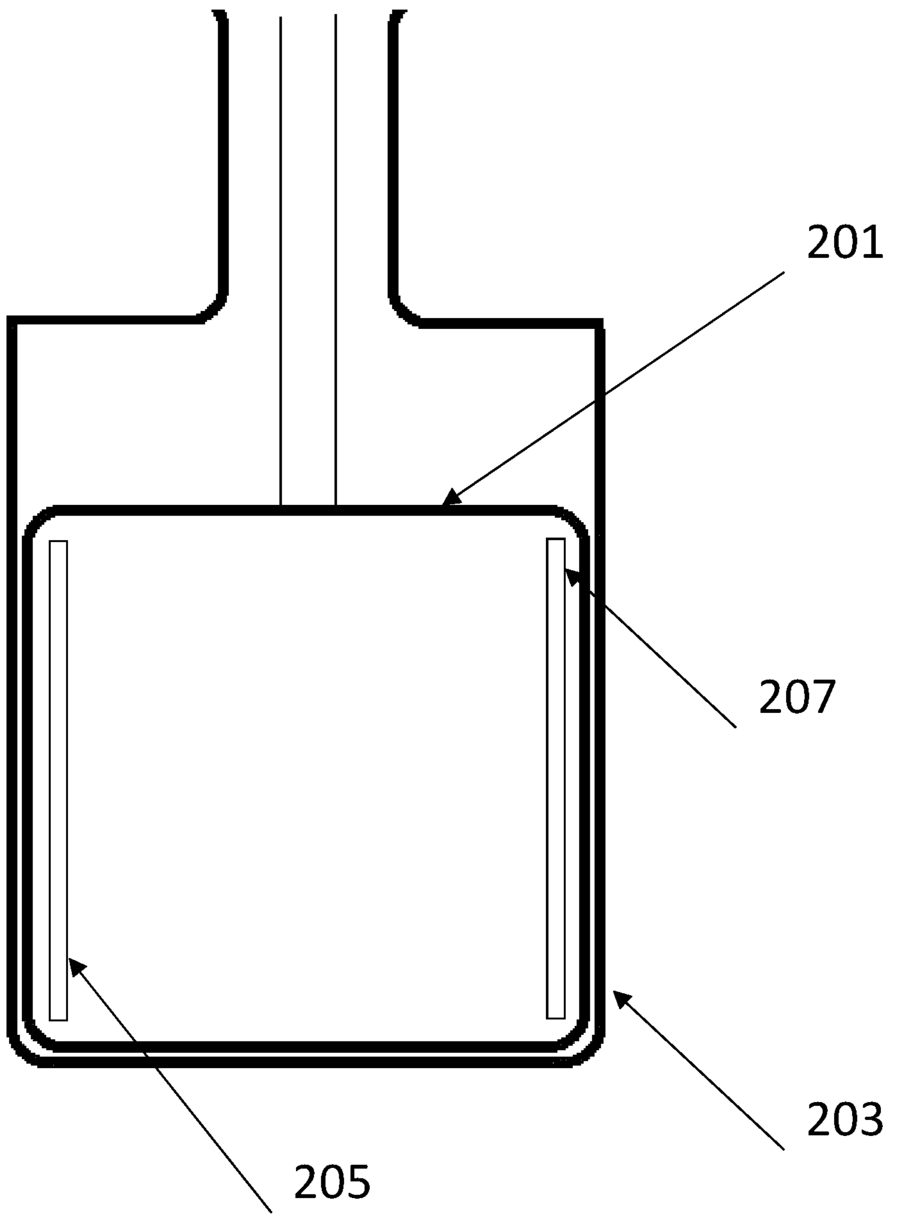
FIG. 2 shows an alternate embodiment of the invented system.

FIG. 2 depicts another embodiment of the present invention wherein the component is a piston 201 within a chamber 203. The piston 201 will have two deposits of electronegative material 205, 207 on the sides of the piston to reduce friction as between the piston 201 and chamber 203. The deposits of electronegative material 205, 207 can be contained in separate discrete pockets along the sides of the piston 201 or it can be one contiguous pocket along the entire side of the piston as all the sides of the piston will be in frictional contact with the chamber walls.

Referring back to FIG. 1, components 101 and 103 will be composed of any substance that is important to the operation of the mechanical system or machine. Materials such as steel, magnesium or plastics are commonly used in industrial applications and are all within the scope of the present invention. Components 101 and 103 can also be composed of different materials from each other or be the same material.

Figure 3:
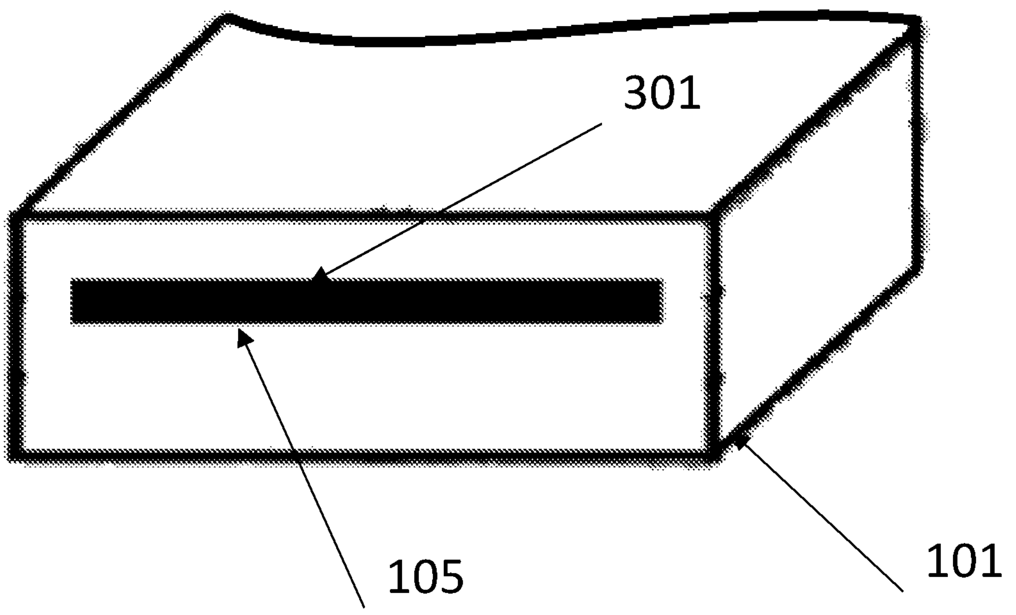
FIG. 3 shows a cut away perspective view of one embodiment of one component of the invented system.
Figure 4A:
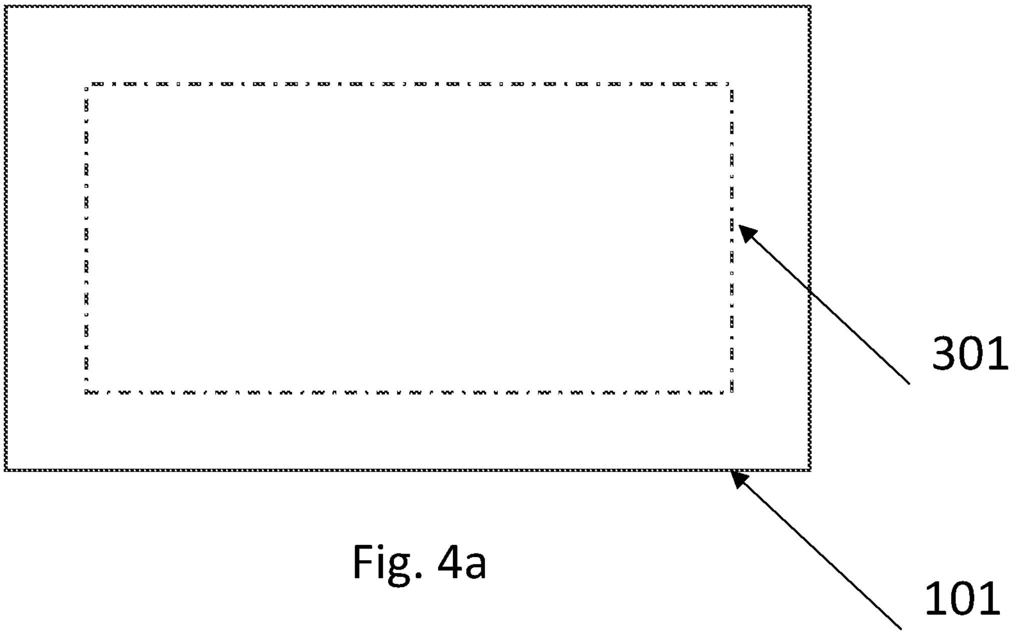
FIGS. 4*a*, 4*b* and 4*c* depicts a top view, a side view and a front view of one embodiment of one component of the invented system.
Figure 4B:
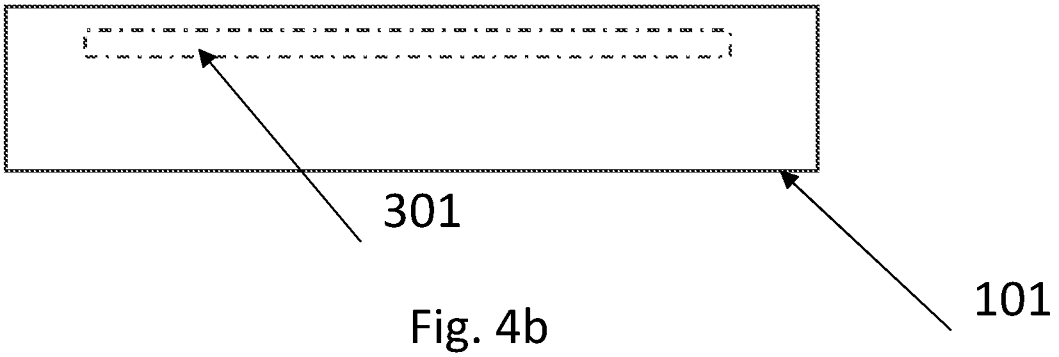
Figure 4C:
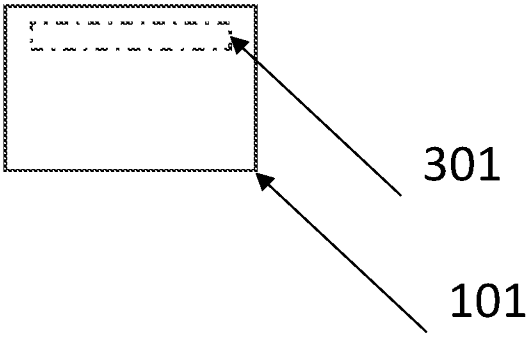

FIG. 3 depicts a closer cutoff view of component 101 depicted in FIG. 1. FIGS. 4*a*, 4*b* and 4*c* depict the top, side and front views of component 101. A pocket 301 will be encased within the interior of component 101. Electronegative material 105 will be placed within that pocket. The pocket will be located close to the surface that will be in contact with the other component 103. The electronegative material 105 will chemically and electrically interact with the component's material above and below the pocket. The location of pocket 301 close to the surface will ensure that the effects of the chemical and electrical interactions between electronegative material 105 and component material 101 will be effected at the surface of the component 101 that physically interacts with component 103. The same or similar features will exist within component 103.

Electronegative material 105 will be composed of a substance that has relatively higher electronegativity properties than the material of component 101. For example, in the case of component 101 being made of steel, arsenic can be used as a suitable electronegative material. With the placement of a relatively higher electronegative substance in pocket 301, electrons in material 101 will be drawn further into the interior of component 101 away from the contacting surface. The surface of component 101 will overall have a more positive polarity as more electrons are drawn toward electronegative material 105. With a more positive polarity, the material at the surface will have a greatly lessened tendency to create temporary dipoles with a similarly polarized contacting surface of component 103. This will substantially reduce the frictional forces between the components 101 and 103. In addition, the interaction of two positively polarized surfaces of components 101 and 103 will create a repulsive magnetic force, which will also reduce the frictional forces between the two surfaces.

The thickness of the material above the pocket will largely be determined by the nature of the component and how it is used in the device. It is important that the material of the component be the contacting surface to the other component 103 and not the electronegative material 107. In addition, in situations where the electronegative material is liquid or gaseous in form, it is also important that the electronegative material is contained within the pocket. In operation, the surface of the component can gradually wear away. Thus, the thickness of the component material above the pocket should be sufficient to accommodate any natural wear and tear due to usage.

The determination of the minimum thickness requirements of the material above the pocket will determine the depth at which the pocket can start. While it is not necessary to start the pocket at the level of minimum thickness requirements, it is usually the most optimal to conserve space in the component. For example, each of the components 101 and 103 could weigh 24 grams and the operation of the component in the device requires that the thickness of the top layer above the pocket must be one third of the 24 grams to maintain the integrity of the device. Alternate embodiments of the invention can allow for small amounts of the electronegative material to be placed within the minimum thickness area of component 101 above the pocket 301 to stimulate the chemical and electrical reactions.

With the starting depth of the pocket determined, (1) the size of the pocket and (2) the identity of the electronegative material to be placed in the pocket can then be determined. These two factors will influence whether the effects of the electrical and chemical reactions that occur between the material of component 101 and the electronegative material will be felt at the surface.

The overall physical dimensions of the material above the pocket and the identity of the substance of the component's composition will help determine how many moles of the electronegative material should be contained therein. There should be a correspondence between the moles of the component's material above the pocket and the moles of the electronegative material such that almost all of the atoms in the component above the pocket can interact with the electronegative material. Given that the electronegative material will interact with all of the components surrounding the pocket, factors such as the interactivity between the electronegative material and the component's material and the luster of the component's material will also assist in determining the size of the pocket.

For example, if components 101 and 103 are made of magnesium (Mg), weigh 24 grams and the thickness of the top layer above the pocket is one third of the 24 grams, a suitable electronegative material to use could be Selenium (Se). As the electronegativity value of Mg is approximately 1.3, the selection of Selenium is appropriate as the electronegativity is approximately 2.6. The molar mass of magnesium is 24 grams per mole. One mole of magnesium contains $6.02\times10^{23}$ atoms and each of those atoms has two electrons in their outer shell. Thus, the surface layer of component 101 will contain 2.0067×10ˆ23 atoms of which each has two electrons that should be pulled away from the contacting surface. Selenium's molar mass is 79 grams per mole. Each atom of selenium has the capacity to pull two electrons towards it. Placing at least 50 grams of selenium may allow selenium to pull electrons from under and above thus keeping electrons trapped in the pocket and away from the surface. The depth of the pocket is dependent on the density. The density of grey selenium is 5.75 g/ml thus to contain 50 grams, one would need a pocket that has an approximate volume of 9 ml that is structured in a way to maintain a large surface area.

As demonstrated above, (1) the size of the pocket and (2) the identity of the electronegative material will determine how effectively friction is reduced between the two components. In determining these two factors, a number of secondary considerations will be used. These considerations include, but are not limited to: (1) the phase of matter of the electronegative material at operating conditions, (2) the properties of the component's material including: (a) the difference between the electronegativity properties of the electronegative material and the component material. (b) the relative difference of the electronegativity properties of the electronegative material and the component material 101 in comparison to the relative difference of the electronegativity properties of the electronegative material and the component material 103, (c) the potential for chemical reactions between the electronegative material and the component's material, (d) the relative temperature and pressure points that are required to maintain 105 and 107 in liquid phase, and (c) the ionization energy level of both the component material and the electronegative material.

The phase of the matter refers to the natural states that the electronegative matter can exist in, (i) solid, (ii) liquid and (iii) gas, at the temperature and pressure conditions during normal operations. Each of the phases will have advantages and disadvantages depending on the conditions of the surrounding circumstances. A liquid will have more interaction between the electronegative material and the component's material than a solid, which is a desirable outcome. Similarly, a gas will have increased interaction with the component's material than a liquid. A solid will generally stay within the pocket during the operation if not physically contained by the surrounding component material, but a liquid and gas will not. Another consideration is the effect of the change of temperature and pressure conditions when the machine is not in operation. Such change in conditions can cause a liquid to transform a gas or a solid to sublime to a gas and that will cause the material to expand in volume, which would put additional pressure on the surrounding component material. Ideally, an electronegative material that will exist in liquid form is preferred at the operative conditions, but the solid and gas states can be used depending on the conditions. For example, selenium may become liquid at a temperature of about 220° C. when exposed to 1 ATM of pressure but when the pressure is increased to 40 ATM, its melting point will change to approximately 630° C.

The difference between the electronegativity properties of the electronegative material and the component material will affect the choice of the electronegative material because the stronger the difference, the stronger the reduction of frictional forces will be at the surface of the component. Having the ratio of electronegativity values being a 2:1 ratio is effective as in the case of using Selenium when the component is composed of Mg.

The relative difference of the electronegativity properties of the electronegative material and the component material 101 in comparison to the relative difference of the electronegativity properties of the electronegative material and the component material 103 can affect the choices of the electronegative materials and the size of the respective pockets as well. If the difference of the electronegative properties for one component is much larger than the difference of the electronegative properties for the other component, then it is possible that the electronegative material of the stronger component can electrically interact with the other component cause temporary dipoles between the two components to increase friction. In the case where the component is made of Magnesium and the selected electronegative material is Selenium and the top layer of one component is larger than the other, the pocket of the larger top layer would have to be larger to compensate for the greater number of electrons contained within the additional atoms in the larger layer. In the situation where one component is composed of scandium and other component is titanium, the selection of sulfur or carbon for the scandium component and liquid nitrogen for the titanium component respectively is appropriate as the 1:2 ratio of electronegative properties is preserved.

The potential for chemical reactions between the electronegative material and the component's material can create new substances at the junction of the component's material and the electronegative material in the pocket. For example, such reactions can occur if both the component's material and the electronegative material are metals and an alloy can be created between the two metals. As the new substance can have different properties than the original materials, it is important to account for any potential new substances and the effect of those properties would have on creating dipoles at the surface of the components. For example, the static friction coefficient between two components 101 and 103 that are composed of iron is 1. If the electronegative substance used is carbon, the carbon might interact with the iron to create the alloy steel. The static friction coefficient between two steel substances is 0.5 to 0.8.

The relative temperature and pressure points that are required to maintain the electronegative material in liquid phase will factor into the determination of the electronegative material because the process of placing the electronegative material in the pocket usually requires rendering that material in a liquid form to place in the pocket. If the melting point of the surrounding component material is lower than the electronegative material, that placement will be difficult to achieve. For example, using an electronegative material such as arsenic while the component is composed of Magnesium might not be an effective solution. Arsenic at 28 ATM has a melting point of over 800 degrees Celsius, which is far greater than the melting point of magnesium. While it is possible to render the solid electronegative in a more dispersible form such as a fine powder, this factor will be important to consider when selecting the electronegative material.

The ionization energy level of both the component material and the electronegative material will be important to consider because the lower the ionization energy level and the larger the radius of the surface material are, the further the electrons will be pulled away from the surface and the lower the friction coefficient will be. Elements on the lower left of the periodic table have the lowest ionization energies and largest radii, while elements on the upper right of the periodic table have the highest attraction to electrons.

Figure 5:
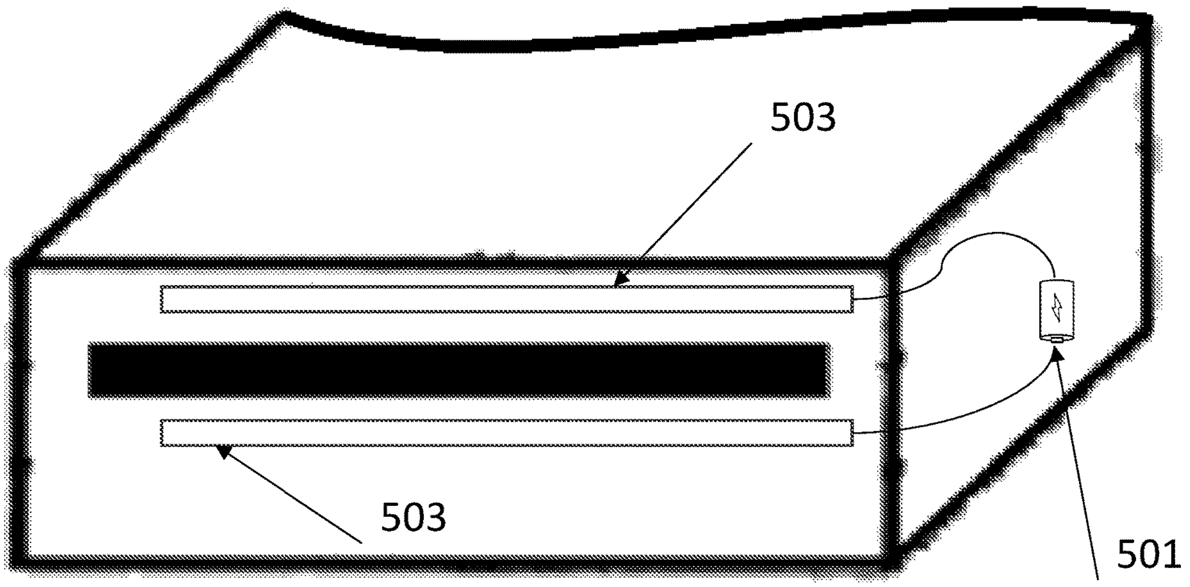
FIG. 5 depict an alternate embodiment of the invented system.

In another embodiment of the present invention, an internal starting mechanism can be inserted within the component surrounding the pocket of electronegative material. This internal starting mechanism can be configured to temporarily induce an electric field across the pocket to induce the start of the electrical and chemical reactions between the electronegative material and the top layer of the component. As depicted in FIG. 5, an internal starting mechanism is composed of an external battery 501 connected to plates 503 inserted to either side of the electronegative material. The external battery can be controlled to temporarily create an electric field as between the two plates. This electric field will induce electrons from the components surface to interact with the electronegative material and start the process of that interaction.

Figure 6:
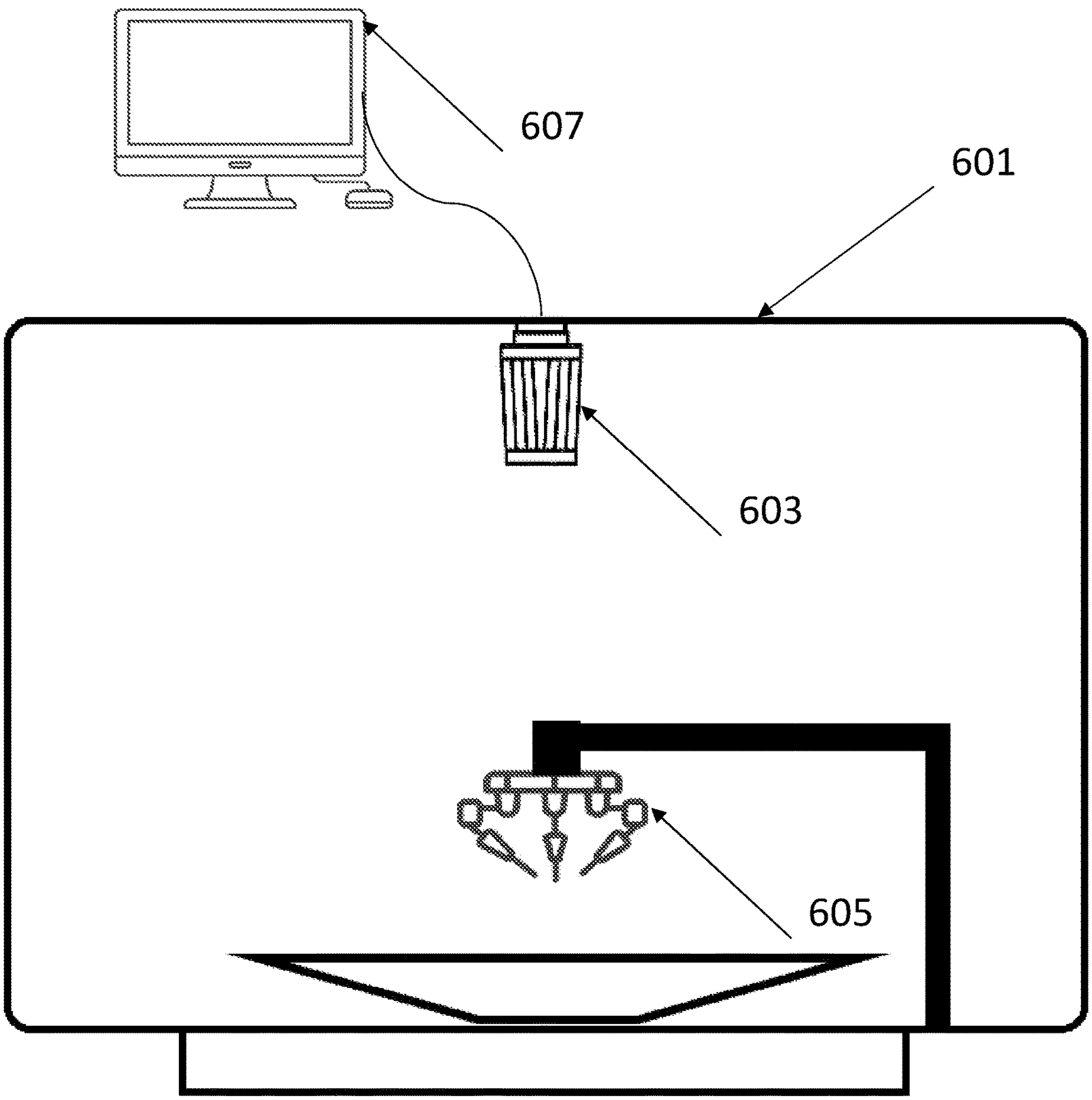
FIG. 6 shows a production system capable of creating the invented system.

The process of creating the invented components will depend on the nature of the component and the material used in the component and the electronegative material. FIG. 6 depicts a system that can manufacture the above described invented components. Manufacturing device is composed of chamber 601, chamber maintenance apparatus 603, material assembly apparatus 605 and controller 607.

Chamber 601 is an enclosed housing that will be used to control the optimal controlled manufacturing environment. A controlled environment plays an important role in ensuring the production of high-quality products with precise specifications and consistent results. This controlled environment is carefully designed and maintained to meet specific requirements, providing optimal conditions for various manufacturing processes. The environmental parameters that will be controlled within chamber 601 can include, but is not limited to (a) temperature, (b) pressure, (c) humidity and (d) ventilation.

Chamber maintenance apparatus 603 will be comprised of the various devices that will be necessary to implement the different types of environmental control described above. Chamber maintenance apparatus will typically be located within chamber 601, but can have protected access to the environment outside of chamber 601. Typical components of chamber maintenance apparatus could include heaters/coolers, vacuum pumps, compressors, humidifiers, and ventilation fans. However, any type of device that would normally be used to regulate environmental conditions within a manufacturing process can be used here and be in the scope of the invention.

Chamber maintenance apparatus 603 will also have suitable measuring devices to allow a user to monitor the environmental conditions and manipulate the various environmental control components accordingly. Chamber maintenance apparatus can also include devices that will change the environment to allow for the component to properly be cured or cooled during the process.

Chamber maintenance apparatus 603 can be manually controlled, but can also be electronically controlled with a controller 607 that will operate the various environmental control components within the chamber 601. Controller 607 can be a typical computer with appropriate software to electronically drive and control the various environmental control devices. Controller 607 will also be in communication with any suitable measuring device that allow it to accurately control the conditions within chamber 601.

Material assembly apparatus 605 will be composed of devices which will be able to construct the structure of the component, the pocket in the component and the layer of the electronegative material within the pocket. Typical devices that will be able to perform this process would be a 3D printer or robotic assembly devices. The material assembly apparatus will have access to source material including the component material and the electronegative material. Supply reservoirs can be optionally included within material assembly apparatus 605. The material assembly apparatus will be controllable by controller 607 that will control the 3D printer or robotic assembly devices to lay the material in the appropriate shape of the component. The controller will also be able to create the appropriately dimensioned pocket within the component at the right depth location of the component.

Figure 7:
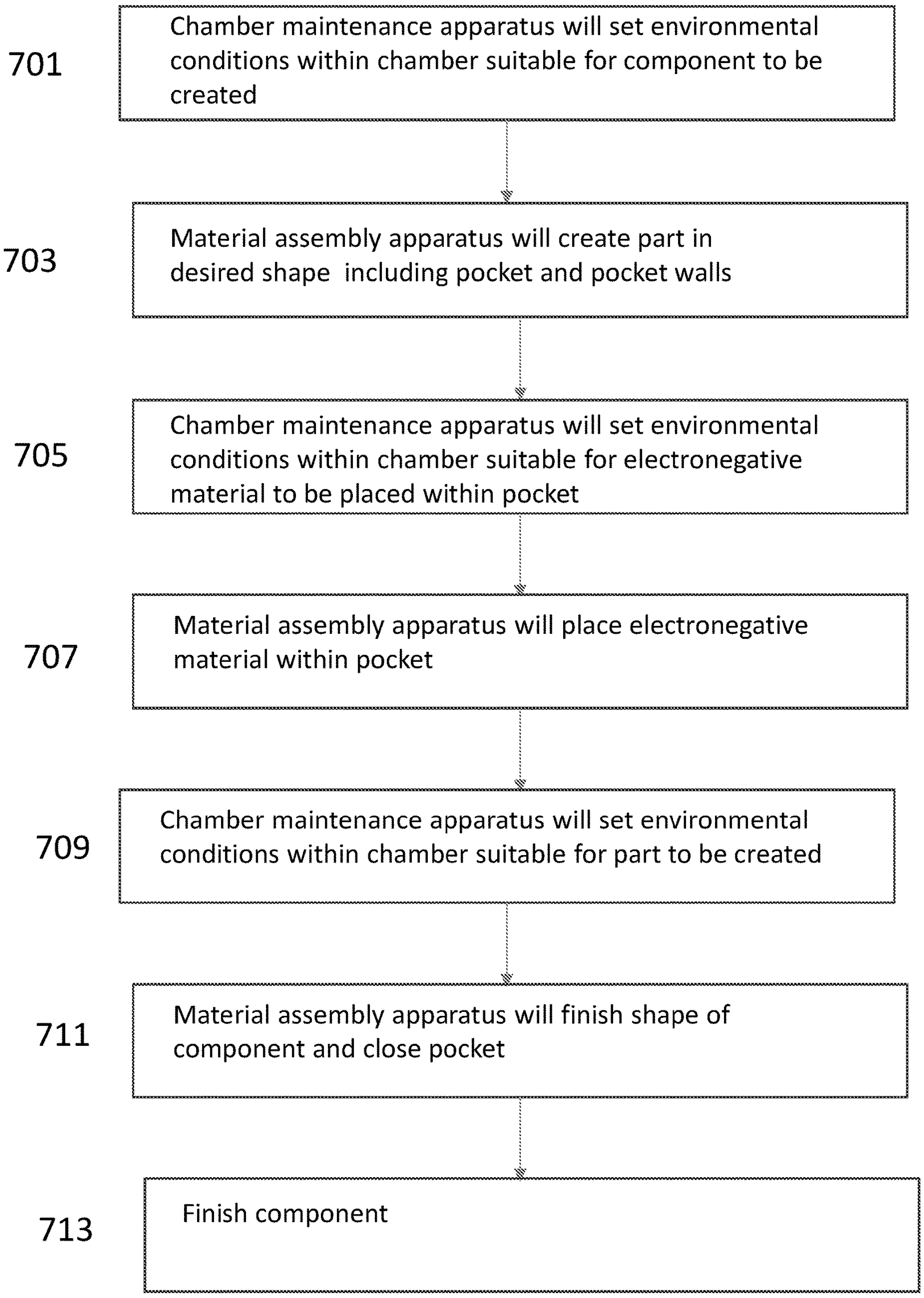
FIG. 7 shows a flowchart showing the manufacturing of the invented system using the production system.

FIG. 7 shows the operation of the manufacturing system depicted in FIG. 6 in creating the invented component. In step 701, chamber maintenance apparatus 603 will set the environmental conditions suitable to the materials that will comprise of component 101. Once the optimal environmental conditions are met, controller will cause material assembly apparatus 605 to start laying out the material of the component in the shape of the desired component in step 703. When the location of the pocket is reached, the chamber maintenance apparatus 603 will create the pocket and the walls of the pocket in the component. The environmental conditions can optionally be altered to cure the material of the component into a hardened form without the layer of component above the pocket depending on the nature of the component's material.

When the pocket and the walls of the pocket have been created, the material assembly apparatus 605 will change the supply reservoir to the material of the electronegative material and cause controller 607 to change the environment suitable to the processing of the electronegative material in step 705. Once those conditions are met, controller 607 will cause the electronegative material to be placed within the pocket and contained within the pocket in step 707. Environmental controls can be adjusted to allow the electronegative material to cure within the pocket.

In step 709, controller 607 will cause the environmental control devices to change the environment back to be suitable to the processing of the component's material. In step 711, the controller will change the supply reservoir back to the component's material and will finish the formation of the component in step 713 to finish the component with the electronegative material firmly contained within the pocket.

While the above embodiments depict the invented system, those of skill in the art will recognize that certain modifications, permutations, additions and sub-combinations thereof. It is intended that the following appended claims to include all such modifications, permutations, additions and sub-combinations as are within their true scope.

What is claimed is:

1. A component comprising:

a body; the body having an outside surface layer; the outside surface layer being comprised of a material that has an electronegativity value and can create friction when interfacing with a surface of another component; and a layer of electronegative material within said body; the layer being situated close to the outside surface layer to interact with said outside surface layer; wherein said electronegative material has an electronegativity value that is higher than the electronegativity value of said outside surface layer; and wherein the layer of electronegative material is situated so that the layer will polarize the outside surface layer positively.

2. The component as claimed in claim 1, wherein the electronegativity value of the electronegative material is approximately twice the electronegativity value of said outside surface layer.

3. The component as claimed in claim 1, wherein the layer of electronegative material is self-contained within a pocket in the body.

4. The component as claimed in claim 1, wherein the layer of electronegative material is a liquid.

5. The component as claimed in claim 1, wherein the layer of electronegative material is situated near the outside surface layer so that the layer will interact with the outside surface layer to move electrons away from the outside surface layer toward the electronegative material.

6. The component as claimed in claim 1, wherein the material of the outside surface layer comprises an amount of moles, and wherein the layer of electronegative material comprises an amount of moles that corresponds to the amount of moles of the material of the outside surface layer.

7. The component as claimed in claim 1, wherein the outside surface layer is comprised of Magnesium and the electronegative material is comprised of selenium.

8. The component as claimed in claim 1 wherein an electric field is created across the layer of electronegative material.

9. The component as claimed in claim 1, wherein the layer of electronegative material can interact with the material of the outside surface layer to create an alloy.

10. A system for reducing friction, comprising:

a first component having a first outside surface layer, the first outside surface layer comprising a first material having a first electronegativity value and being capable of creating friction when interfacing with another component;

a second component in frictional contact with the first component, the second component having a second outside surface layer, the second outside surface layer comprising a second material having a second electronegativity value and being capable of creating friction when interfacing with another component;

wherein the first component has a first layer of electronegative material within the first component situated close to the first outside surface layer so as to interact with the first outside surface layer, the first layer of electronegative material having an electronegativity value greater than the electronegativity value of the material of the first outside surface layer;

wherein the second component has a second layer of electronegative material within the second component situated close to the second outside surface layer so as to interact with the second outside surface layer, the second layer of electronegative material having an electronegativity value greater than the electronegativity value of the material of the second outside surface layer; and wherein the first layer of electronegative material and the second layer of electronegative material are respectively positioned such that the first and second outside surface layers are polarized positively.

11. The system as claimed in claim 10, wherein the first outside surface layer and the second outside surface layer exhibit the same positive electrical polarity.

12. The system as claimed in claim 10, wherein the first layer of electronegative material will interact with the material of the first outside surface layer to move electrons away from the material of the first outside surface layer toward the first layer of electronegative material and the second layer of electronegative material will interact with the material of the second outside surface layer to move electrons away from the material of the second outside surface layer toward the second layer of electronegative material.

13. The system as claimed in claim 10, wherein the electronegativity value of the first layer is higher than the first electronegativity value of the material of the first outside surface layer in substantial substantially the same proportion that the electronegativity value of the second layer is higher than the second electronegativity value of the material of the second outside surface layer.

14. The system as claimed in claim 10, wherein the first material and the second material are the same material, and wherein the first layer of electronegative material and the second layer of electronegative material are the same material.

15. The system as claimed in claim 10 wherein the first layer of electronegative material will interact with the material of the first outside surface layer and the second layer of electronegative material will interact with the material of the second outside surface layer to decrease the creation of temporary dipoles at the frictional contact area.

16. A method of manufacturing a component for reducing friction, the method comprising:

forming a body having an outside surface layer, the outside surface layer comprising a material having an electronegativity value and being capable of creating friction when interfacing with another component;

forming a pocket within the body sufficiently close to the outside surface layer to permit interaction between the layer of electronegative material and the outside surface layer;

placing a layer of electronegative material within the pocket;

wherein the electronegative material has an electronegativity value greater than the electronegativity value of the material of the outside surface layer; and wherein the layer of electronegative material is situated so that the layer will polarize the outside surface layer positively.

17. The method as claimed in claim 16 wherein the pocket is located sufficiently close to the outside surface layer such that the electronegative material interacts with the outside surface layer.

18. The method as claimed in claim 16 wherein the placing step places an amount of electronegative material within the pocket sufficient to move electrons away from the outside surface layer toward the electronegative material.

19. The method as claimed in claim 16 wherein the electronegativity value of the electronegative material is greater than the electronegativity value of the material of the outside surface layer in a predetermined proportion.

20. The method as claimed in claim 16 wherein the electronegativity value of the electronegative material is approximately twice the electronegativity value of the material of the outside surface layer.

* * * * *